(12) United States Patent
Schneebeck et al.

(10) Patent No.: US 10,248,926 B2
(45) Date of Patent: Apr. 2, 2019

(54) METHOD OF, AND CONSIGNMENT MAGAZINE AND VEHICLE FOR, DELIVERING CONSIGNMENTS

(71) Applicants: Holger Schneebeck, Köln (DE); Boris Trendafilov, Bonn (DE); Sandra Drees, Königswinter (DE); Heike Bischoff, Köln (DE); Antje Huber, Bonn (DE)

(72) Inventors: Holger Schneebeck, Köln (DE); Boris Trendafilov, Bonn (DE); Sandra Drees, Königswinter (DE); Heike Bischoff, Köln (DE); Antje Huber, Bonn (DE)

(73) Assignee: Deutsche Post AG, Bonn (DE)

( * ) Notice: Subject to any disclaimer, the term of this patent is extended or adjusted under 35 U.S.C. 154(b) by 61 days.

(21) Appl. No.: 15/397,596

(22) Filed: Jan. 3, 2017

(65) Prior Publication Data

US 2017/0200114 A1 Jul. 13, 2017

(30) Foreign Application Priority Data

Jan. 8, 2016 (DE) ........................ 10 2016 100 244

(51) Int. Cl.
*G06Q 10/08* (2012.01)
*B60P 3/00* (2006.01)
(Continued)

(52) U.S. Cl.
CPC ........... *G06Q 10/083* (2013.01); *B07C 3/008* (2013.01); *B60P 3/007* (2013.01); *G07F 11/52* (2013.01)

(58) Field of Classification Search
CPC ........ B60P 3/007; G07F 11/52; G06Q 10/083
See application file for complete search history.

(56) References Cited

U.S. PATENT DOCUMENTS

| 4,232,988 A | 11/1980 | Kochanneck |
| 4,254,872 A | 3/1981 | Garrett |
| 2016/0224930 A1* | 8/2016 | Kadaba ................ G06Q 10/083 |

FOREIGN PATENT DOCUMENTS

| DE | 2 031 442 A1 | 12/1971 |
| DE | 26 10 034 A1 | 9/1976 |

(Continued)

*Primary Examiner* — D Glenn Dayoan
*Assistant Examiner* — Melissa A Black
(74) *Attorney, Agent, or Firm* — Reinhart Boerner Van Deuren P.C.

(57) ABSTRACT

The invention relates to a method of delivering consignments, in which, in a distribution center, different consignment chambers of a consignment magazine are loaded with different consignments, in which, during the operation of the consignment magazine being loaded, different consignment chambers are moved one after the other into a receiving position for receiving at least one consignment and then into a storage position for the interim storage of the consignments received, in which the assignment of the loaded consignment chambers to the consignments received in each case in the consignment chambers is documented, in which the consignment magazine loaded with consignments is transferred to a vehicle for delivering the consignments, and in which the consignment chambers loaded with consignments are moved one after the other into a discharging position so that the consignment assigned the respective consignment chamber is discharged for delivery purposes.

19 Claims, 5 Drawing Sheets

(51) Int. Cl.
*G07F 11/52* (2006.01)
*B07C 3/00* (2006.01)

(56) References Cited

FOREIGN PATENT DOCUMENTS

| | | |
|---|---|---|
| DE | 44 12 097 C1 | 6/1995 |
| DE | 197 44 349 | 4/1999 |
| DE | 200 21 257 U1 | 6/2001 |
| DE | 102 05 533 A1 | 8/2003 |
| DE | 203 14 968 U1 | 1/2004 |
| DE | 10 2009 024 195 A1 | 12/2010 |
| GB | 811615 | 4/1959 |

* cited by examiner

METHOD OF, AND CONSIGNMENT MAGAZINE AND VEHICLE FOR, DELIVERING CONSIGNMENTS

CROSS-REFERENCE TO RELATED PATENT APPLICATION

This patent application claims priority to German Application No. 10 2016 100 244.5, filed Jan. 8, 2016, the entire teachings and disclosure of which are incorporated herein by reference thereto.

FIELD OF THE INVENTION

The invention relates to a method of delivering consignments, to a consignment magazine for receiving, storing and discharging consignments, and to a vehicle for delivering consignments.

BACKGROUND OF THE INVENTION

It is often the case that, prior to being delivered to the consignment addressees, consignments are often pre-sorted, and grouped according to the geographical area of the addressees, in a distribution centre. The distribution centre may be, for example, a so-called parcel sorting centre, a warehouse or the like. The grouped consignments are received by a delivery vehicle at the distribution centre and driven thereby to the consignment addressees or to appropriate dropoff points, for example parcel boxes or Packstations, where delivery may then take place.

When the consignments are being loaded into the delivery vehicle, the consignments, or codes provided thereon, are scanned individually and placed in a certain position on a rack system in the delivery vehicle in dependence on the address of the addressee or of the dropoff points. This is done usually by the delivery man himself, who also drives the vehicle and delivers the consignments at the locations envisaged therefor. This therefore documents that the delivery man has received all the consignments. In addition, consignment tracking is possible and the driver or delivery man knows precisely which locations he has to call at for delivery purposes. The delivery man can establish his route with reference to the analogous address information provided on the consignments. The actual delivery of the consignments can then take place for example by the latter being handed personally to the addressee or to an authorized individual and by being left at a certain dropoff point, for example a parcel box or a Packstation.

Also known are methods in which consignments are first of all stowed in consignment magazines, for example in the form of rolling containers or swap bodies, and is then shifted for delivery purposes. Since it is difficult to access the individual consignments on the delivery vehicle, this procedure is used in particular for delivering a large number of consignments to a small number of addressees, wherein the consignments can be distributed beforehand, in dependence on the addressees, to different consignment magazines. The addressee, usually a company and less often a private individual, is therefore given preferably all the consignments from a consignment magazine, for example in the form of a rolling container or a swap body, in particular the appropriate consignment magazine together with the appropriate consignments. This can be done, for example, in exchange for an empty consignment magazine, and therefore the consignment magazines do not accumulate at addressees and are available in short order again for the delivery of further consignments.

Consignments here are considered to be a variety of different articles which can be transported, preferably as far as their size and weight are concerned, with reasonable outlay. In particular the consignments may be in the form of single units. These include articles for everyday use, such as consumables or foods, and also technical articles and equipment. In many cases, the consignments are letters, parcels and/or flyers. Parcels here also cover packets, while flyers may also be catalogues, brochures and periodicals. In addition, a letter may also be in the form of a postcard.

The delivery efficiency can be adversely affected by a series of factors. Efficient delivery of the consignments can be hampered, for example, by an increased volume of traffic, addressees not being present, disadvantageous delivery routes of the delivery vehicle or other drawbacks. It is likewise the case that more and more importance is being placed on consignment delivery which is as quick and cost-effective as possible, the number of consignments which are to be delivered increasing ever more at the same time.

BRIEF SUMMARY OF THE INVENTION

It is therefore an object of the present invention to configure, and develop, the method, the consignment magazine and the vehicle, each of the type mentioned in the introduction and explained in more detail above, such that consignments can be delivered more efficiently.

This object is achieved by a method of delivering consignments, in which, in a distribution centre, different consignment chambers of a consignment magazine are loaded with different consignments, in which, during the operation of the consignment magazine being loaded, different consignment chambers are moved one after the other into a receiving position for receiving at least one consignment and then into a storage position for the interim storage of the consignments received, in which the assignment of the loaded consignment chambers to the consignments received in each case in the consignment chambers is documented, in which the freight container loaded with consignments is transferred to a vehicle for delivering the consignments, and in which the consignment chambers loaded with consignments are moved one after the other into a discharging position so that the consignment assigned to the respective consignment chamber is discharged for delivery purposes.

Furthermore, the aforementioned object is achieved in the case of a consignment magazine having at least one disc portion with an inner annular portion and an outer annular portion, which is arranged concentrically in relation to the inner annular portion, and in that each annular portion has a plurality of preferably circumferentially distributed consignment chambers.

In addition, the aforementioned object is achieved in the case of a vehicle that includes at least one consignment magazine that is coupled in a releasable manner to the vehicle.

The invention has recognized that consignments can be delivered more quickly if use is made of a consignment magazine which contains consignment chambers, to be precise also for the case where the consignments are to be delivered to a very large number of addressees. It is thus possible, even in the distribution centre, for the consignment magazine to be loaded with an entire series of consignments which each have to be delivered to different addressees. The consignments here are received individually, or if required grouped together for identical addressees, in different consignment chambers. The operation of the consignment chambers being loaded with consignments here takes place in at least one receiving position, into which the consignment chambers which are to be loaded are moved for loading purposes. When the consignment chambers are located in a receiving position, it is possible, in principle, for in each case at least one consignment to be fed to the consignment chambers from the outside. If required, however, other boundary conditions in addition to mere positioning in the receiving position have to be met in order for the consignment chambers to be loaded.

Since the consignment chambers are loaded when the consignment chambers are located in at least one of, if required, a number of receiving positions, it also being possible, if required, for each consignment chamber to be moved only into one of the number of receiving positions, it can be readily established which consignment chamber has been loaded with at least one consignment. If it is also known which at least one consignment has been fed to the at least one consignment chamber, it is possible to document the clear assignment of consignments and consignment chambers receiving the same. For this purpose, it is possible for a consignment or a corresponding code to be scanned prior to the consignment being received. In addition, the operation of a consignment being received can be captured by a sensor, for example a light barrier. It is also possible for at least one conveying belt carrying the consignment to be moved specifically such that it is possible to capture, without the use of sensors, when the consignment has been discharged to the consignment magazine. If, furthermore, information is supplied relating to which point in time which consignment chamber has been located in a certain receiving position, it is easily possible to assign the received consignments to the consignment-receiving consignment chambers. This information is stored for the subsequent delivery of the consignments.

Once a consignment chamber has received at least one consignment, the corresponding consignment chamber can be moved into a storage position, wherein preferably at the same time at least one other consignment chamber can be moved into the receiving position. In the storage position, the consignment chamber can retain, or store on an interim basis, the at least one consignment, if required, until such time as the consignment has to be discharged from the consignment magazine again for delivery purposes.

As far as the process is concerned, prior to the consignments being delivered, the consignment magazine is first of all transferred, together with the consignments received in the consignment chambers, to a vehicle which drives the consignment magazine to the delivery locations at which the consignments are to be delivered and which may correspond, for example, with the consignment addressees or with dropoff points, for example parcel boxes or Packstations. At the corresponding delivery locations, or in the vicinity thereof, the corresponding consignments are then discharged from the consignment magazine. The discharging operation can take place here such that the consignment magazine discharges the consignments automatically, or such that the consignment magazine allows the delivery man to remove the consignments in a discharging position of the corresponding consignment chambers. For this purpose, at least one consignment chamber, in which the at least one consignment which is to be delivered is accommodated, is moved into a discharging position, from which the at least one consignment can be discharged.

Since the clear assignment of the consignments to a consignment chamber, said assignment being documented for evaluation purposes, is known, it is easily possible to determine which consignment chamber has to be moved into a discharging position in order to discharge a certain consignment from the consignment magazine for delivery purposes. Therefore, the consignment chambers can be moved into a discharging position in the correct order, even if, during the operation of the consignment magazine being loaded, it was not yet known in which order the consignments should be delivered or if the order of delivery should be changed following loading of the consignment magazine with the consignments, for example because this appears to be more effective on account of the current traffic situation. As a result, the consignments can be received, if required, in any desired order in any desired consignment chambers of the consignment magazine. This simplifies and accelerates, if required, the operation of loading the consignment magazine with consignments. It is thus possible, in some circumstances, for the consignments to be received in any desired order in consignment chambers of the consignment magazine and for the same consignments then to be discharged again in likewise any desired order. This can mean that the consignments are received in an unsorted state in the consignment magazine. However, the consignments can nevertheless be discharged in a state in which they have been sorted in accordance with predetermined criteria, that is to say in an order which is defined by predetermined criteria such as the delivery address or the like. As far as the method is concerned, therefore, a very high level of flexibility is maintained over a very long period of time for the delivery of the consignments, without the above method steps involving significantly more outlay as a result.

The at least one consignment may be an article in the form of a single unit. In particular it is possible for the consignments to be articles for everyday use, such as consumables or foods, and technical articles and equipment. The at least one consignment is preferably a letter, parcel and/or flyer. The method is particularly advantageous in such cases. A flyer here may, if required, also be a brochure, periodical and/or a catalogue, while a parcel may also be a packet. In addition, a letter may also be in the form of a postcard.

The at least one consignment is particularly preferably a parcel. This is because the operations of delivering and/or collecting such consignments involves particular outlay, for example because parcels do not fit into letterboxes and are larger and heavier than, for example, letters.

In order for consignments to be received, and stored on an interim basis, in a space-saving manner, it is recommended in design terms, in accordance with the consignment magazine according to the invention, that the consignment magazine has concentric annular portions which are arranged at least essentially in a joint plane and can thus form a disc portion of the consignment magazine. Accordingly, the at least two annular portions of a disc portion are subdivided into at least one inner annular portion and one outer annular portion. It is also possible, if required, for at least one further annular portion to be provided therebetween, should this be advantageous, for example, for reasons of space and from design points of view. However, the method according to the invention is not necessarily restricted to the use of such consignment magazines.

The annular portions may each have a series of consignment chambers which can be moved into at least one receiving position and at least one discharging position. It is thus possible, correspondingly, for a relatively large number of consignments to be received in the consignment magazine. In order for it to be possible for the consignment chambers to be moved straightforwardly, quickly and reliably into the appropriate receiving position and/or discharging position, it is particularly recommended for the consignment chambers to be distributed, at least in part, over the circumferences of the annular portions. It is then possible for the consignment chambers to be moved into the receiving position, the discharging position and/or the storage position for example by virtue of the consignment chambers of at least one annular portion being pivoted about a central axis or by virtue of the appropriate annular portion being rotated about the central axis. This ultimately results in the method and design being simplified.

In addition, delivery can be simplified and accelerated if the consignment magazine is loaded independently of the delivery vehicle. The delivery vehicle can be used for example also for delivering consignments while consignments which are to be delivered at a subsequent point of time are being received in a consignment magazine. This also means that the consignment magazine need not necessarily be loaded by the delivery man or the driver himself. All that is thus required is for the delivery man to interrupt the consignment delivery briefly and, once the consignments from a consignment magazine have been delivered, for the then, if required, empty consignment magazine to be changed over, for example at the distribution centre, for a loaded consignment magazine. For this purpose, the vehicle for delivering the consignments can be coupled in a releasable manner to at least one consignment magazine. For coupling purposes, the vehicle has, if required, a freight holder, a chassis or the like.

Coupling can take place here in different ways, it being preferred if a connection can be formed in a releasable manner between the vehicle and the consignment magazine. This prevents the consignment magazine from detaching from the vehicle or getting lost during travel. If required, it is possible to provide, for this purpose, a form-fitting connection between the vehicle and the consignment magazine. The consignment magazine can be accommodated, for example, in a holder of the vehicle, so that the consignment magazine cannot slide from the vehicle. It is also possible, however, to provide for the consignment magazine to be secured in the vehicle by bolts or the like. Also possible are force-fitting connections such as screw connections. The connections, however, should be capable of being straightforwardly and quickly closed and released again, in order to ensure quick and uncomplicated changeover of consignment magazines on a vehicle.

The method, the consignment magazine and the vehicle, each of the aforementioned type, will be described together hereinbelow, to aid understanding and to avoid unnecessary repetitions, without any distinctions being made specifically between the method, the consignment magazine and the vehicle. However, a person skilled in the art will readily see, from the context, which features are preferred for the method, the consignment magazine and the vehicle.

In a first preferred configuration of the method, the consignment chambers are moved by rotation of at least one part of the consignment magazine. This operation is straightforward, precise and reliable, all the more so if at least one annular portion, which contains consignment chambers, is rotated, to be precise, if required, about a central axis. As an alternative, or in addition, rotation can take place such that at least one consignment chamber is moved from the receiving position into the storage position and/or from the storage position into the discharging position. Although it is not necessary here for other consignment chambers of the consignment magazine to move as well, it is nevertheless preferred if another consignment chamber here moves into the receiving position and/or from the discharging position. If the consignment chambers are provided one beside the other, as seen over the circumference of the annular portion, the simultaneous movement of a plurality of consignment chambers is possible in a straightforward, quick and precise manner.

In order to prevent a consignment from passing accidentally out of the associated consignment chamber, in particular from slipping out of a consignment chamber, for example during movement of the plurality of consignment chambers, the at least one consignment chamber can be closed for storing the consignments in a storage position. In order for the receiving and/or discharging operations to take place in a specific and reliable manner nevertheless, or at all, provision is made as an alternative, or in addition, for the at least one consignment chamber to be opened for receiving the consignments in the receiving position and for discharging the consignments in the discharging position. The operation of at least one consignment chamber being opened and closed can take place, in principle, in different ways. It is possible, for example, for the at least one consignment chamber to be assigned a closure device for closing an opening, for example comprising a shutter or a slide, which is fixed to the consignment chamber and which therefore moves with the at least one consignment chamber. It is also possible, however, to provide a closure device which frees the opening of the at least one consignment chamber only under certain conditions, but otherwise closes the same. This can reduce the design outlay to a considerable extent, even if it may adversely affect the flexibility and the reliability. It is then possible for the closure device to move with the consignment chamber or to be arranged at a fixed location. The latter case is more straightforward, but may involve functional disadvantages. Furthermore, it is possible for the closure device to move homogeneously with the at least one consignment chamber or at least partially independently of the consignment chamber. It can thus be ensured that the consignments do not leave the consignment chambers accidentally. If the closure device is not fixed to the at least one consignment chamber, it is possible for at least one opening of a housing of the annular portion to be opened for receiving the consignments in the receiving position, to be opened for discharging the consignments in the discharging position and/or to be closed for storing the consignments in a storage position. This can be done by the annular portion being specifically opened and closed, but it is also possible for at least one opening of the annular portion to be made to coincide with the at least one consignment chamber in certain situations, in order for a consignment to be received or discharged. In other situations, a position in which the opening coincides with the consignment chamber can be avoided, in order to prevent a consignment from being received and/or discharged accidentally.

In order for it to be possible for a very large number of consignments to be received in an extremely confined amount of space in the consignment magazine without the functionality of the latter being adversely affected to too pronounced an extent, it is possible for at least two concentric annular portions each to be provided with consignment chambers, wherein the inner concentric annular portion is accommodated centrally in the outer concentric annular portion. It is then recommended for the outer annular portion not to have consignment-containing consignment chambers, at least not continuously over its circumference. This is because consignments can be received by the inner annular portion and/or be discharged therefrom, only to a limited extent. If, however, the outer annular portion has at least one free consignment chamber, or does not have a consignment chamber over certain regions of its circumference, said consignment chamber, or said free region, can be used for loading and/or unloading consignment chambers of the inner annular portion. For the purpose of loading the consignment chambers and/or for the purpose of discharging the consignments from the consignment chamber of an inner annular portion, the consignments can then be moved, very straightforwardly and reliably, through at least one outer concentrically arranged annular portion. It is nevertheless possible here, however, for the outer annular portion to have consignment chambers for receiving consignments in other regions of its circumference, the capacity of the consignment magazine thus being increased as a result.

The operation of the consignment magazine being loaded with consignments can be simplified, if required, in that the consignment chambers are loaded with consignments under the action of gravitational force and/or in that the consignments are discharged from the consignment chambers under the action of gravitational force. The consignment chambers or the consignment magazine can thus be arranged such that the openings of the consignment chambers are oriented upwards, at least in part, in the receiving position. Consignments can then fall or slide into the corresponding consignment chambers without any further drive power being necessary for this purpose. If the openings of the consignment chambers are oriented downwards, at least in part, in the discharging position, it is thus possible for the consignments to fall and/or slide of their own accord out of the consignment magazine. On a quite fundamental basis, it is possible to benefit the transportation processes of the consignments within the consignment magazine if the consignment magazine is loaded with consignments in one orientation, whereas the consignments are discharged in a different orientation of the consignment magazine. It is thus possible, if required, for the consignment magazine itself to be adjusted, preferably rotated, to be precise in particular about a longitudinal axis of the consignment magazine, between a loading position for loading the consignment magazine with consignments and an unloading position for unloading consignments. As an alternative, or in addition, however, it is also possible for just at least one annular portion, certain annular portions or all the annular portions to be rotated, in order for the consignment magazine to be adjusted from the loading position into the unloading position and back again.

In order that the vehicle can carry on at a large number of consignments for delivery purposes, it is recommended for a plurality of disc portions of a consignment magazine to be loaded with consignments, wherein each disc portion has consignment chambers for receiving consignments. In order that good use can be made of the disc portions, for their part, each disc portion may have at least one annular portion, which is provided concentrically in relation to the annular portions of the other disc portions. Each of the annular portions then has, in addition, preferably a series of consignment chambers, which may be distributed over the circumference of the respective annular portion. It is even more efficient, however, if the disc portions, at least in part, have at least two concentrically arranged annular portions. As far as the annular portions of a disc portion are concerned, then, in particular one annular portion is an inner annular portion, which is accommodated centrally, at least in part, in an outer annular portion. If required, further annular portions are also provided therebetween. Each annular portion here is accommodated preferably in the next outer annular portion. In addition, each annular portion may have preferably a series of consignment chambers, in particular distributed over the respective circumference. This ultimately provides a large number of consignment chambers in the consignment magazine for a large number of consignments, and these, in addition, can be loaded and unloaded straightforwardly.

In order for consignments to be received in the consignment chambers of a plurality of concentric annular portions and/or for consignments to be discharged from the consignment chambers of the annular portions, it is possible for preferably at least one inner annular portion and an outer annular portion, which is arranged concentrically in relation to the inner annular portion, to be rotated independently of one another about their longitudinal axis, to be precise irrespective of whether a consignment is to be received or which consignment is to be discharged. For the operations of receiving and discharging a consignment, the outer concentric annular portion can be rotated into a position in which consignments can pass through the outer concentric annular portion in order to be received in a consignment chamber of the inner annular portion and/or to be discharged from a consignment chamber of the inner annular portion.

As far as the method is concerned, account can also be taken of the situation where at least one consignment already discharged from the consignment magazine cannot be delivered as intended. The corresponding consignment then has to be carried along on the onward journey of the vehicle in order that the consignment can be delivered at a later point in time or can be held at a collection point for collection, for example, by the addressee. There is no need, however, for any special place to be reserved on the vehicle for corresponding consignments. It is possible for the at least one undeliverable consignment already discharged from the consignment magazine, for example following an unsuccessful delivery attempt, to be received again by the consignment magazine. Once again a consignment chamber is brought into a receiving position, in which the consignment chamber receives the undelivered consignment. The consignment magazine and the consignments can be readily handled, as required, on site by the delivery man. For example it is possible for the at least one consignment to be placed into an annular portion and, preferably following closure of the annular portion and/or of the respective consignment chamber, for the annular portion to be rotated. The consignment chamber which has received the consignment is moved into a storage position. Back at the distribution centre, the corresponding consignment can then be discharged, if required, anew from the consignment magazine. As an alternative, however, it is also possible for the consignment to remain in the consignment magazine, in order for delivery to be attempted anew during the next delivery round.

The efficiency of the consignment delivery can be increased further if the consignments are discharged from the consignment magazine, preferably automatically, one after the other in dependence on the route covered by the vehicle. During the operation of the consignment magazine being loaded, it is documented which consignments are received. This information can be used to determine which locations have to be called at in order to deliver the consignments, and this, in turn, can be utilized in order to calculate an optimum delivery route. This may be, for example, the shortest route, the quickest route or the most economical route. If the route has been established, it is clear, as a result of the assignment between the consignments and the consignment chambers in which the consignments are accommodated, which consignment chambers have to be moved one after the other into the discharging position in order for it to be possible for the consignments to be delivered in the predetermined order.

The consignment magazine can receive consignments, and discharge consignments again, in a straightforward and reliable manner if the consignment chambers and/or the annular portions each have an outwardly oriented and closable opening. It is possible here for the consignment chambers for example themselves to have closure devices or it is possible to provide closure devices which, rather than being fixed to the consignment chambers, interact with the consignment chambers at least in certain positions of the consignment chambers.

As an alternative, or in addition, the consignment magazine may have at least two disc portions, in order for a multiplicity of consignments to be received therein. In order for the consignment magazine, at the same time, to be compact and easy to handle, the disc portions are arranged preferably axially one beside the other. As an alternative, or in addition, it is possible to provide an operating portion, in particular alongside at least one disc portion. The operating portion here may have means for moving the consignment chambers. For example the operating portion can be used to move individual annular portions. As an alternative, or in addition, it is also possible for the operating portion to have means for closing at least certain consignment chambers, in particular at least certain parts of individual annular portions. It is also conceivable for the operating portion to have means which capture the position in which individual consignment chambers, or even all the consignment chambers, are located. This then serves, for example, for assigning consignments and consignment chambers during loading of the consignment magazine and/or the specific discharge of the consignments.

In this context, it is also recommended for the consignment magazine to be of modular construction or to represent a modular construction. It is then possible for the consignment magazine to be provided, as required, with more or fewer disc portions. In order to be able to provide a high level of flexibility for the use of the consignment magazine, it is possible for individual disc portions of a consignment magazine to be straightforwardly and quickly supplemented and/or removed. A consignment magazine can thus be provided with different numbers of disc portions for successive uses or assignments of consignments. It is thus possible for the consignment magazine to be adapted to the respective shipping volume and/or the size or length of the delivery vehicle. In addition, the quantity of consignment magazines necessary and the storage-related outlay required for said magazines are reduced.

The operating portion may have, for example, at least one drive unit for moving at least certain consignment chambers, in particular certain annular portions, and/or for closing at least certain consignment chambers, in particular certain annular portions. It is then possible for the corresponding consignment chambers to be moved more or less independently of the vehicle. As an alternative, or in addition, the operating portion may have a capturing unit for capturing a receiving position of at least one consignment chamber when consignments are being received in the respective consignment chamber. This too can take place independently of the vehicle as such. It is also possible for the movement of certain consignment chambers to be controlled independently of the vehicle if the operating portion has at least one control unit. The movement of individual consignment chambers can be controlled such that the movement of the consignment chambers into a receiving position, a discharging position and/or a storage position is controlled in accordance with at least partially predetermined criteria.

In order that the desired consignments can be removed more quickly and flexibly from a consignment magazine having a plurality of disc portions, it may be advantageous if the annular portions of different disc portions can be moved and/or driven, at least in part, independently of one another. However, for the purpose of reducing the outlay specific to apparatus and design, it may also be preferred if at least some annular portions of different disc portions are moved and/or driven at the same time. In a simple scenario, for example inner annular portions of different, in particular adjacent, disc portions can be moved and/or driven jointly. As an alternative, or in addition, correspondingly outer annular portions of different, in particular adjacent, disc portions can be moved and/or driven jointly. It may be even easier, in this context, if all the inner annular portions of the disc portions, provided in a modular state if required, are moved and/or driven jointly. The same applies if all the outer annular portions of the disc portions, provided in a modular state if required, are moved and/or driven jointly.

In order for it to be possible for the consignments to be received securely and reliably in the consignment chambers, and to avoid the situation where the consignments are discharged accidentally from individual consignment chambers, at least one annular portion and/or at least one consignment chamber may have at least one closure device for closing an opening for receiving and/or discharging consignments. The closure devices may thus be assigned on a permanent basis to certain consignment chambers, but it is also possible for the closure devices to be assigned to the consignment magazine, to the annular portions and/or housing parts of the annular portions, and therefore the closure devices can be assigned to different consignment chambers in different positions of the consignment magazine. The latter case can contribute to a more straightforward design of the consignment magazine, but can possibly result in more complicated operation of the consignment magazine.

In the case of a plurality of disc portions being present, the consignment chambers and/or the annular portions can each be closed, at least in part, independently of one another, so that it is possible to provide for a high level of flexibility for unloading the consignments. In order to limit the outlay in terms of design and apparatus, however, it is nevertheless recommended for at least some consignment chambers and/or annular portions of different disc portions to be closed at the same time. In a simple scenario, for example inner annular portions of different, in particular adjacent, disc portions or the consignment chambers thereof can be closed jointly. As an alternative, or in addition, correspondingly outer annular portions of different, in particular adjacent, disc portions or the consignment chambers thereof can be closed jointly. It may be even easier, in this context, if all the inner annular portions of the disc portions, provided in a modular state if required, or the consignment chambers thereof are closed jointly. Analogously, the same applies if all the outer annular portions of the disc portions, provided in a modular state if required, or the consignment chambers thereof are closed jointly. Quite fundamentally, a joint closing operation can reduce the number of closure devices required, since the joint closing operation for example of different annular portions can take place, if required, using a single closure device. As an alternative, or in addition, it is possible for individual inner annular portions, or all the inner annular portions, to be accommodated in a common tubular housing, which can be closed for the individual annular portions or all the annular portions, using, if required, a single closure device. Accordingly, it is possible as an alternative, or in addition, for individual outer annular portions, or all the outer annular portions, to be accommodated in a common tubular housing, which can be closed for the individual annular portions, or all the annular portions, using, if required, a single closure device. It may also be recommended in principle, for a straightforward and reliable control of the consignment magazine, for the jointly moved annular portions also to be closed jointly using, if required, a single closure device.

The vehicle, furthermore, may have a drive device for moving at least certain consignment chambers. This means that at any rate not all the consignment chambers have to be moved by the consignment magazine itself, which can simplify the configuration of the consignment magazine from the point of view of apparatus. In particular it is recommended for entire annular portions and/or disc portions to be moved via the drive device of the vehicle. It is also possible for at least certain consignment chambers or annular portions to be closed, if required, by means of the drive device of the vehicle.

In order for it to be possible for the consignment magazine to be advantageously retained and operated on the vehicle, the vehicle may have a bar portion, which engages in an axial aperture of the consignment magazine. The consignment magazine can then be pushed onto said bar portion, which can extend in the longitudinal direction of the vehicle. It is then also preferred, for the purpose of pushing the consignment magazine on, if the bar portion has a free end assigned to the rear side of the vehicle. The bar portion may have, if required, means for driving at least one inner annular portion of the consignment magazine and/or means for capturing the position of at least one consignment chamber and/or of at least one inner annular portion of the consignment magazine. It is possibly sufficient here if the bar portion is connected or coupled to certain devices of the consignment magazine. The driving power and/or capturing means can then be supplied, for example, by other parts of the vehicle, which are then preferably connected to the bar portion.

As an alternative, or in addition, it is possible for the vehicle and/or the consignment magazine to have a processor which, with reference to position-specific information, in particular GNSS (Global Navigation Satellite System) information, for example Global Positioning (GPS) information, GLONASS information, Galileo navigation information, BeiDou navigation information and/or QZSS information, delivery information is determined. Delivery information here can establish which consignment should be the next to be delivered and is also used for driving and/or for controlling the consignment magazine to the extent where the consignment chamber assigned to the corresponding consignments is moved into a discharging position for discharging and delivering the corresponding consignment, to be precise, if required, by a drive unit, which may be coupled to the processor.

The vehicle and the consignment magazine preferably have means for bidirectional data transmission, in order for it to be possible for data to be exchanged between the vehicle and the consignment magazine. It is then possible, for the sake of simplicity, for the corresponding means for bidirectional data transmission to be connected to one another, in particular as a matter of course, for example when the consignment magazine is transferred to the vehicle. As an alternative, or in addition, the processor may have a database for storing data, for example relevant freight data relating to the consignments, or other consignment data, being held in said database. It is particularly preferred here if the database is in the form of part of the consignment magazine. This means that the data are coupled, that is to say, as it were, "married", to the consignments in the consignment magazine. It is also possible in principle, however, for the database, or a further database, to be part of the vehicle.

BRIEF DESCRIPTION OF THE SEVERAL VIEWS OF THE DRAWING

The invention will be explained in more detail hereinbelow with reference to a drawing, which illustrates merely an exemplary embodiment and in which.

DETAILED DESCRIPTION OF THE INVENTION

Figure 1:
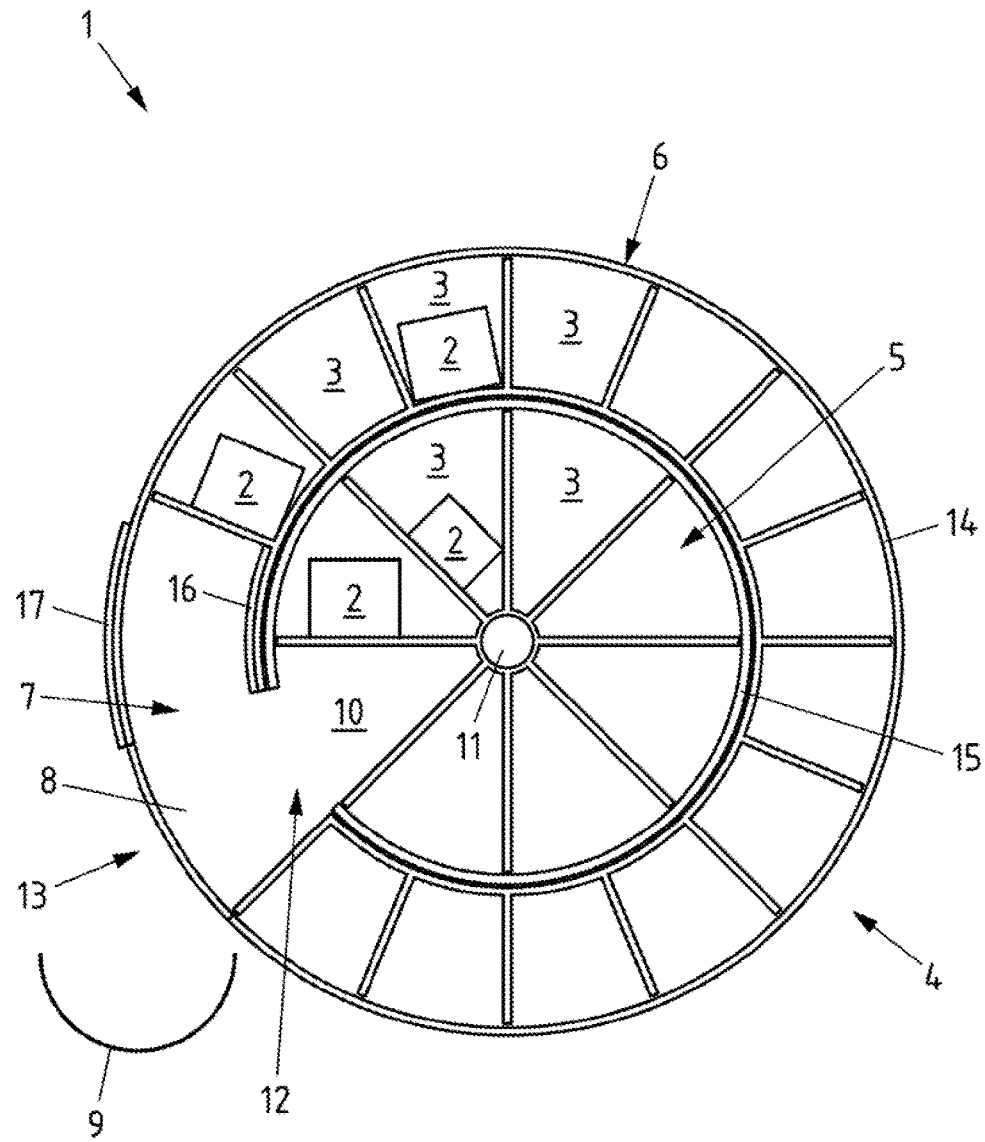
FIG. 1 shows a consignment magazine according to the invention in a lateral sectional illustration as seen transversely to the longitudinal axis of the consignment magazine.

FIG. 1 illustrates a consignment magazine 1 in which a series of consignments 2 are accommodated. For this purpose, the consignment magazine 1 has consignment chambers 3, into which the consignments 2 can be introduced. The consignment magazine 1 which is illustrated, and to this extent preferred, is a disc portion 4 with two concentric annular portions 5, 6. The inner annular portion 5 here is accommodated in the outer annular portion 6. In addition, in both annular portions 5, 6, consignment chambers 3 are distributed one beside the other over the circumference. Whereas consignment chambers 3 are provided over the entire circumference of the inner annular portion 5, the outer annular portion 6 has consignment chambers 3 only in certain regions, albeit over the majority of its circumference. However, there is also a portion 7 without any consignment chambers 3. This portion 7 can be used in order for consignments 2 to be introduced into the inner annular portion 5, or for consignments 2 to be discharged from the inner annular portion 5, through this portion 7. When the appropriate consignment chamber 3 is moved into the discharging position 8, the consignments 2 slide through the outer annular portion 6 into a discharging channel 9, from where the consignments 2 can be removed by the delivery man. The consignments 2 can slide, if required, along the discharging channel 9 in the direction of the rear end of the consignment magazine 1, where they can then be received more easily by the delivery man. It is also possible if required, however, for the consignments 2 to be removed from the side of the consignment magazine 1. The consignments 2 accommodated in the consignment chambers 3 of the outer concentric annular portion 6 can be discharged irrespectively of the orientation of the inner annular portion 5. For this purpose, the respective consignment chamber 3 of the respective annular portion 6 is moved into the discharging position 10, in which in the case of the consignment magazine 1 which is illustrated, and to this extent preferred, the consignments 2 slide out of the outer annular portion 6. In the case of the consignment magazine 1 which is illustrated, and to this extent preferred, consignments 2 are thus discharged under the action of gravitational force.

In order to move the consignment chambers 3 into the discharging position 8, 10, depending on the consignment chambers 3 of the disc portion 4 at least one annular portion 5, 6 is rotated about a central axis 11 of the disc portion 4. In the case of the consignment magazine 1 which is illustrated, and to this extent preferred, the annular portions 5, 6 can be rotated optionally in opposite directions. Therefore, all the consignment chambers 3 of an annular portion 5, 6 move or none of the consignment chambers 3 of an annular portion 5, 6 moves. In order for it to be possible for a consignment 2 to be discharged from the inner annular portion 5, the outer annular portion 6 has to be moved into a basic position, in which the outer annular portion 6 allows consignments 2 to pass through the outer annular portion 6 from the inner annular portion 5. This basic position is illustrated in FIG. 1.

In the case of the consignment magazine 1 which is illustrated, and to this extent preferred, the consignment chambers 3 are open. In principle, however, this involves the risk of consignments 2 sliding out of the consignment chambers 3 accidentally when the annular portions 5, 6 are being rotated. This applies, in particular, because the consignments 2 have been accommodated in the consignment magazine 1 preferably not in a certain order or in accordance with a certain pattern or because it is still possible for the order in which the consignments 2 are discharged to be changed after said consignments have been accommodated in the consignment magazine 1. If consignments 2 have not yet been discharged from certain consignment chambers 3, accidental discharge of the consignments 2 is avoided by virtue of an outer opening 12, 13 of the respective annular portion 5, 6 or of the housing 14, 15 of the corresponding annular portion 5, 6 being closed. The corresponding closure devices 16, 17 here are illustrated in the form of slides. However, it would also be possible to have, for example, shutters. In order to provide better clarity, the drive of the closure devices 16, 17 has not been illustrated. However, suitable drives, for example electromagnetic drives, are known to a person skilled in the art. If the closure devices 16, 17 close the openings 12, 13 of the annular portions 5, 6, the consignment chambers 3 can be rotated without any consignment 2 sliding out of its consignment chamber 3. Therefore, the closure devices 16, 17 also close, if required, an opening of at least one consignment chamber 3. As an alternative, it would, of course, also be possible to change the orientation of the consignment magazine 1, in particular to rotate the consignment magazine 1 as a whole so that the openings 12, 13 of the annular portions 5, 6 are oriented upwards. Gravitational force then prevents a consignment 2 from sliding out of a consignment chamber 3 when the consignment chambers 3 are rotated about the central longitudinal axis 11. In order for certain consignments 2 to be discharged, the consignment magazine 1 can then be rotated again, for example into the orientation according to FIG. 1, in order to make use of gravitational force for discharging the consignments 2.

Gravitational force is also utilized for receiving consignments 2 into the consignment chambers 3. For this purpose, the consignment chambers 3 are moved into a receiving position 8, 10, these receiving positions, in the case of the consignment magazine 1 which is illustrated, and to this extent preferred, corresponding, in principle, to the discharging positions 8, 10. For the receiving operation of the consignments 2, however, the consignment magazine 1 itself is arranged differently to that illustrated in FIG. 1, that is to say the receiving positions 8, 10 are arranged in the upward direction. The consignments 2 then slide of their own accord into the consignment chambers 3. Since it is always the case, in a certain position of the disc portion 4, that a consignment chamber 3 can receive a consignment 2, it is possible to establish, during the operation of the consignment magazine 1 being loaded, which consignment 2 is received in which consignment chamber 3 if the order of the consignments 2 fed is known, which can be ensured, for example, by a code on the consignments 2 being scanned prior to the consignments being received in a consignment chamber 3 of the consignment magazine 1.

Figure 2:
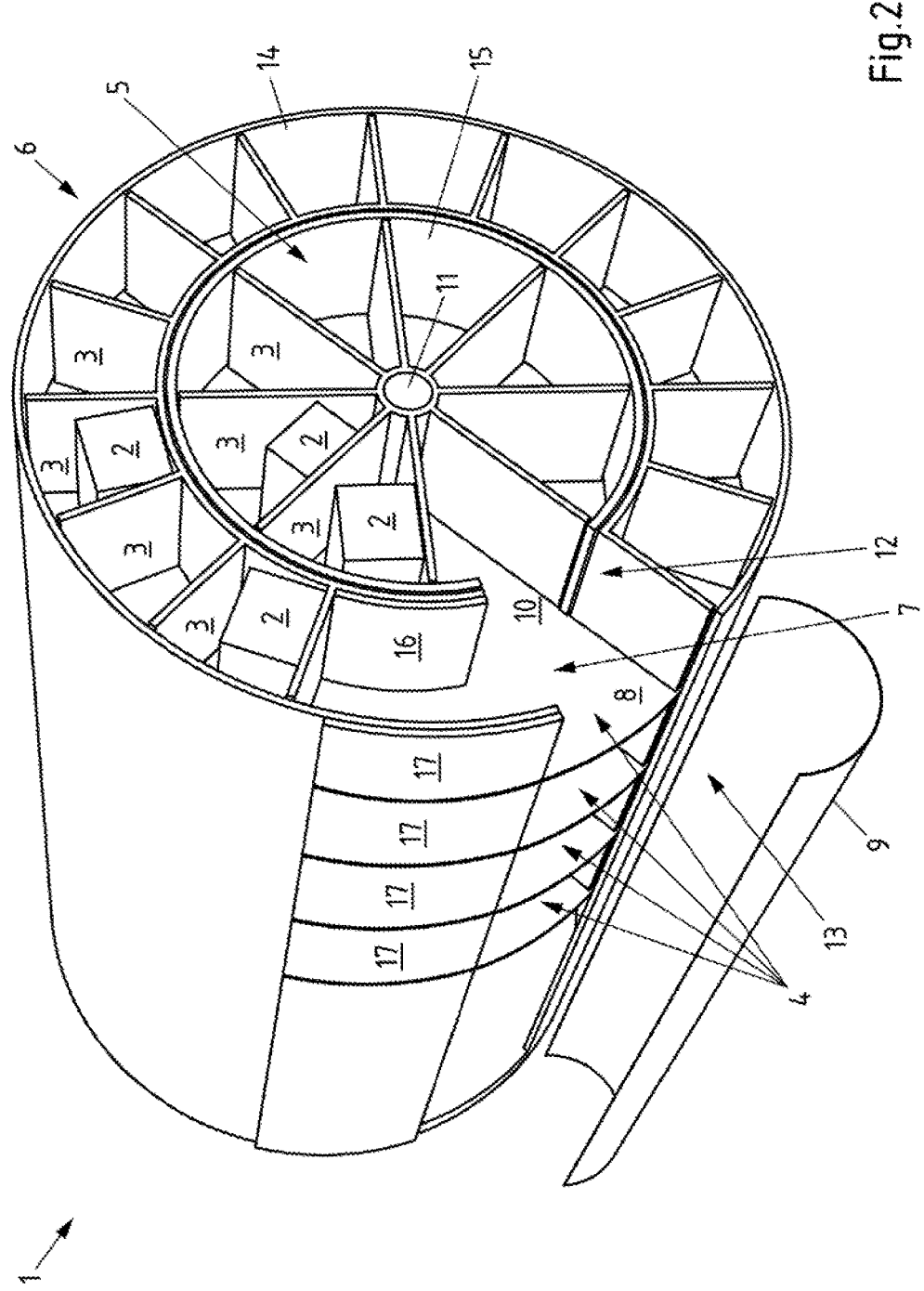
FIG. 2 shows a perspective view of the consignment magazine from FIG. 1.

FIG. 2 illustrates a perspective view of the consignment magazine 1. The consignment magazine has four disc portions 4, as are illustrated in principle in FIG. 1. The disc portions 4, of which it would also be possible, in principle, to provide more or fewer, are arranged one beside the other and concentrically in relation to one another. This gives rise to a joint central longitudinal axis 11 of the consignment magazine 1, about which the annular portions 5, 6 are rotated and the consignment chambers 3 are pivoted or moved. In addition, in the case of the consignment magazine 1 which is illustrated, and to this extent preferred, each annular portion 5, 6 has a separate, and separately operable, closure device 16, 17. It would also be possible, however, for the closure devices 16, 17 to be connected in each case to form one closure device, in which case only two closure devices 16, 17 have to be handled for the consignment magazine. As an alternative, or in addition, the consignment magazine 1 may be configured such that the inner annular portions 5 and/or the annular outer portions 6 are rotated jointly in order for the consignments 2 accommodated in the consignment magazine 1 to be discharged.

Figure 3:
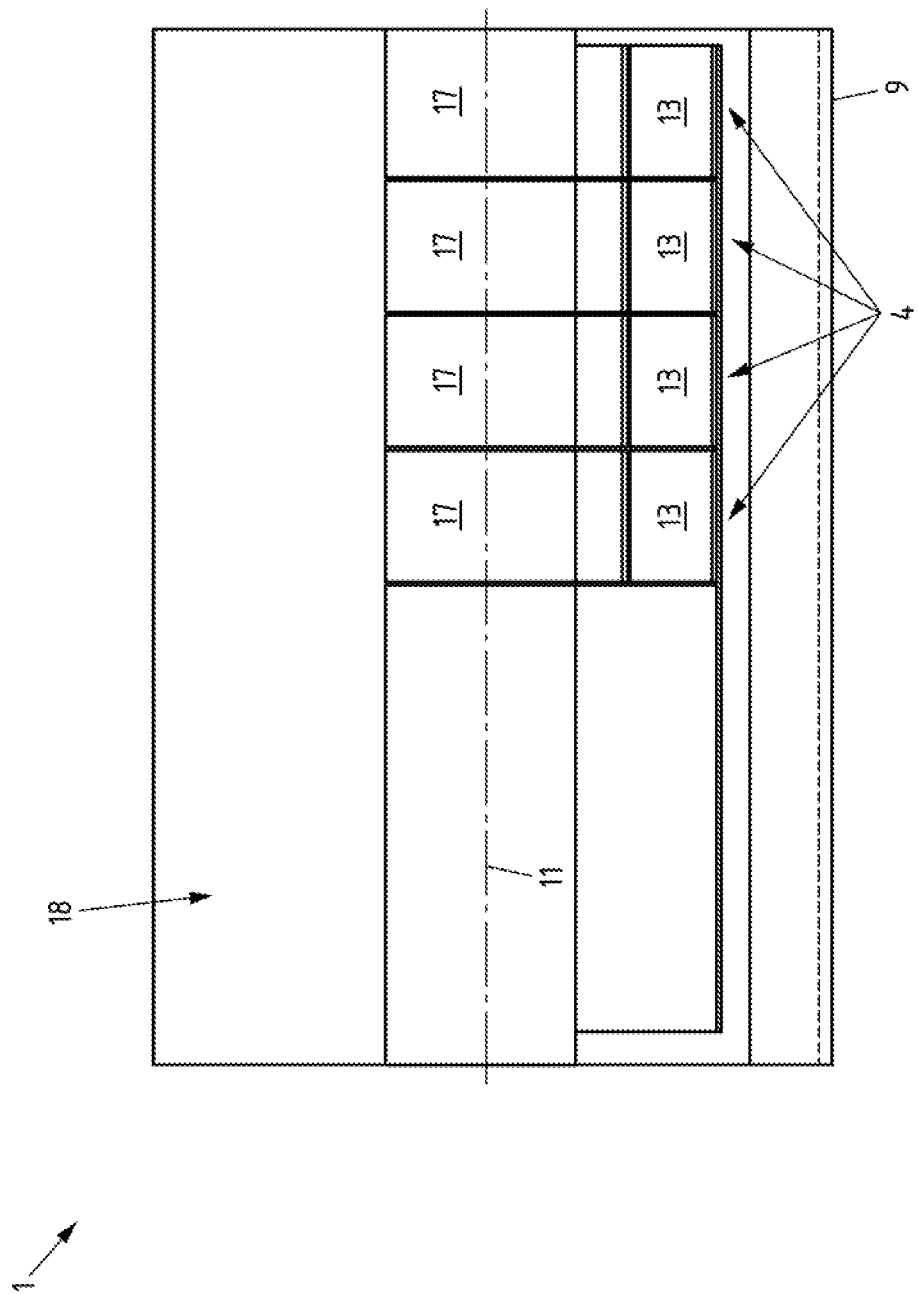
FIG. 3 shows the consignment magazine from FIG. 1 in a side view as seen transversely to the longitudinal extent.

It is illustrated in particular in FIG. 3 that the consignment magazine 1, in addition to the four disc portions 4, also has an operating portion 18, which is provided alongside the disc portions 4. In the case of the consignment magazine 1 which is illustrated, and to this extent preferred, the operating portion 18 is oriented concentrically in relation to the disc portions 4, said operating portion, in addition, having approximately the same diameter as the disc portions 4. The consignment magazine 1 which is illustrated, and to this extent preferred, is therefore designed approximately in the form of a cylinder.

The operating portion 18 of the consignment magazine 1 which is illustrated, and to this extent preferred, serves for controlling the discharging operation of the consignments 2 and the assignment of the consignments 2 received to the consignment chambers 3. Alongside the control function, the operating portion 18 also moves or rotates the consignment chambers 3 or the annular portions 5, 6, at least in part. With the aid of the control function, individual consignment chambers 3 can be moved specifically into the receiving position 8, 10 and/or the discharging position 8, 10, to be precise in dependence on whether a consignment 2 is to be received or discharged. Moreover, it is also possible for at least some annular portions 5, 6 to be opened and closed via the operating portion 18. This too can be controlled by a control means, which defines which consignments 2 should be discharged at which points in time and which should not. It is further possible for the operating portion 18 to determine the position of the vehicle 19, for example in the form of GPS information, and, if required on the basis of the consignments 2 received in the consignment magazine 1, to determine that route of the vehicle 19 for delivering the consignments 2 which is optimum in accordance with predetermined criteria. In order to establish the route, use can also be made, if required, of information relating to the current and/or future traffic situation, the desired delivery time and/or an alternative delivery address. In order for it to be possible for the abovedescribed tasks to be performed, the operating portion 18 of the consignment magazine 1 which is illustrated, and to this extent preferred, has a drive device. The latter can adjust, for example directly, individual annular portions 5, 6 or closure devices 16, 17. Provision may also be made, however, for the drive device to drive at least individual annular portions 5, 6 and/or closure devices 16, 17 via a bar portion 20 of the vehicle 19, said bar portion engaging centrally in the consignment magazine 1. The operating portion 18 may also have a capturing device, which captures the current position of the individual consignment chambers 3 or annular portions 5, 6. Said capturing device may be connected to the control device, which controls at least the partial control function of the consignment magazine 1 for receiving and/or discharging the consignments 2.

If required, it is also possible for the above-described means of the operating portion 18 to be provided, in whole or in part, as part of the vehicle 19 and not of the consignment magazine 1. It may be advantageous, however, for the means to be provided instead in the operating portion 18, this therefore creating an inseparable unit, which can increase reliability for implementing the method. The vehicles 19 can then be coupled as desired, and in a flexible manner, to the consignment magazine 1. However, for example the drive of the, in particular, outer, annular portions can be simplified if the drive power is provided from the vehicle 19, for example via drive rollers or drive wheels, which are coupled to the outer annular portions 6 when the consignment magazine 1 is placed in position.

Irrespective of the arrangement of the at least one operating portion 18, the consignment magazine 1 may be designed so that the inner annular portions 5 are moved jointly and/or so that the outer annular portions 6 are moved jointly. It would also be possible, if required, to provide an outer tubular housing, which encloses the inner and the outer annular portions 5, 6 and, if required, the operating portion 18. It is then possible for the tubular housing to contain the at least one closure device 17 and/or to be closed by virtue of the discharging channel 9 being placed against it.

Figure 4:
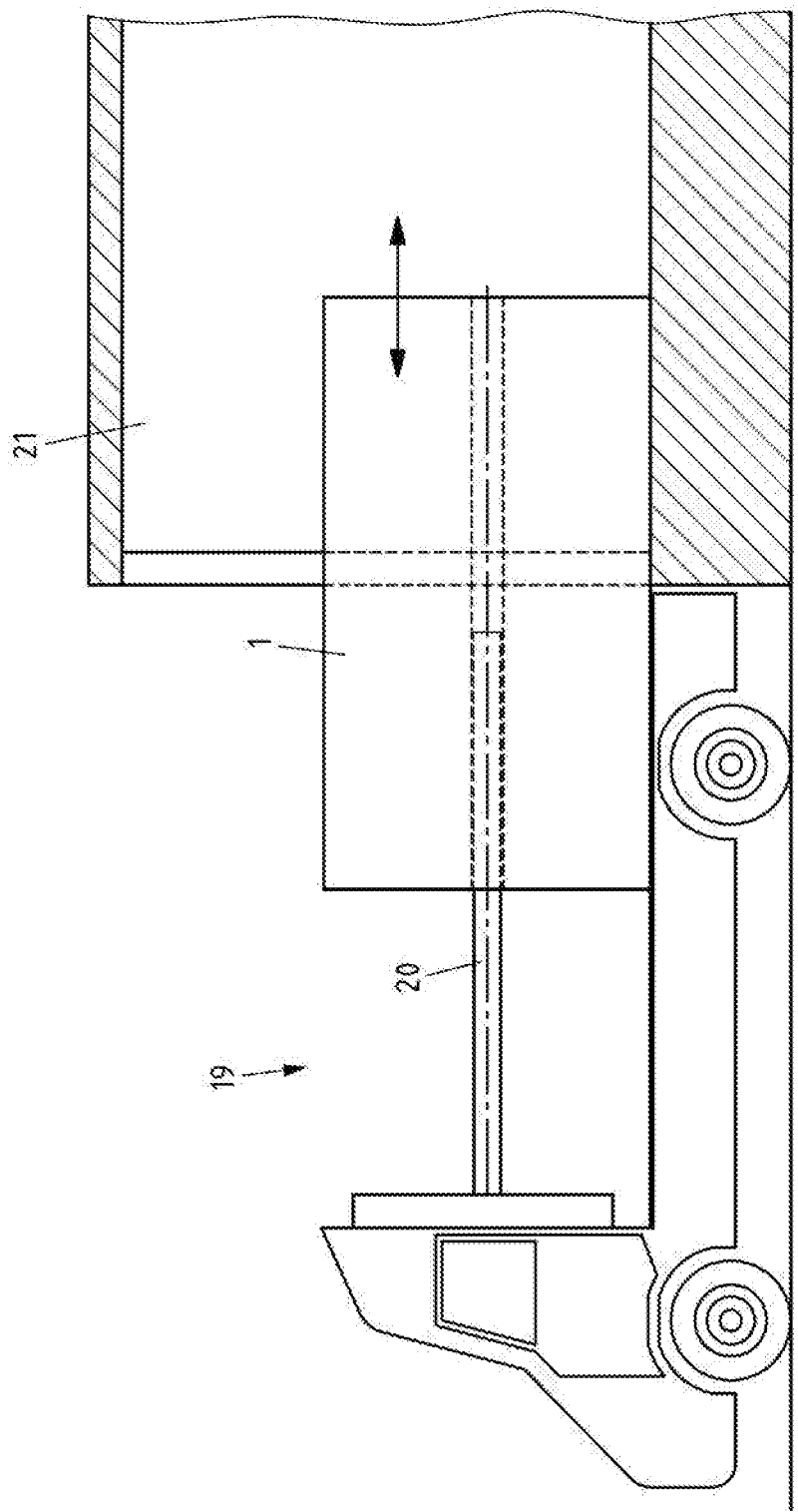
FIG. 4 shows a schematic illustration of the consignment magazine from FIG. 1 being coupled to a delivery vehicle for the purpose of delivering the consignments.

FIG. 4 illustrates an example of a consignment magazine 1 being coupled to a vehicle 19 for the purpose of delivering the consignments 2 in the consignment magazine 1. First of all, without the vehicle 19 being present, the consignment magazine 1 is loaded with consignments in a distribution centre 21, for example a so-called parcel sorting centre. The consignment magazine 1 is then moved onto a vehicle 19, to be precise, if required, once an empty consignment magazine 1 has been transferred to the distribution centre 21 from the vehicle 19. A bar portion 20 is provided for the purpose of receiving the consignment magazine 1, said bar portion engaging in an inner aperture of the consignment magazine 1. The bar portion 20 here may be coupled mechanically, for example via protrusions and/or apertures, to the consignment magazine 1, in particular to certain annular portions 5, 6, for instance in order to identify which position individual annular portions 5, 6 assume and/or in order to rotate individual annular portions 5, 6.

As an alternative, however, it is also possible for the bar portion 20 to be part of the consignment magazine 1 and therefore to remain with the consignment magazine 1 when the consignment magazine 1 is unloaded. Furthermore, the bar portion 20 can be driven by the consignment magazine 1 itself in order for, for example, individual annular portions 5, 6 to be rotated. It is then possible to do away with a connection between the bar portion 20 and the vehicle 19 when a secure connection is established, for example elsewhere, between the consignment magazine 1 and the vehicle 19 and/or the consignment magazine 1 is suitably positioned on the vehicle 19. It is also possible however as an alternative, or in addition, to establish a connection between the bar portion 20 and the vehicle 19, in particular as a matter of course, when the consignment magazine 1 is being received by the vehicle 19.

In the case of the vehicle 19 which is illustrated, and to this extent preferred, the consignment magazine 1 is not accommodated in a body, for example a box body, of the vehicle 19, although this would be possible, for example in order to protect the consignment magazine 1 against environmental influences. Doing away with a body, however, can improve the accessibility of the consignment magazine 1 and allows use to be made of a larger consignment magazine 1, which provides more space for the consignments 2 and/or for more consignments. It is then possible, for example, for the discharging channel 9 to have openings so that dirt and/or rainwater do not/does not collect in the discharging channel 9. As an alternative, or in addition, the discharging channel 9 can be placed against the consignment magazine 1, so that no dirt and/or rainwater, or little dirt and/or rainwater, can pass into the discharging channel 9 and/or the consignment magazine 1. The consignment magazine 1 and/or the opening 13 of at least one outer annular portion 6 can be closed by the discharging channel 9. It is possible, in principle, for the consignment magazine to have an outer, in particular tubular, housing, in which the inner and outer annular portions 5, 6, and if required the operating portion 18, are accommodated. This housing could then be closed in addition for example by the discharging channel 9 or another closure device, in order to prevent consignments from being discharged accidentally and/or dirt and/or moisture from penetrating.

Figure 5:
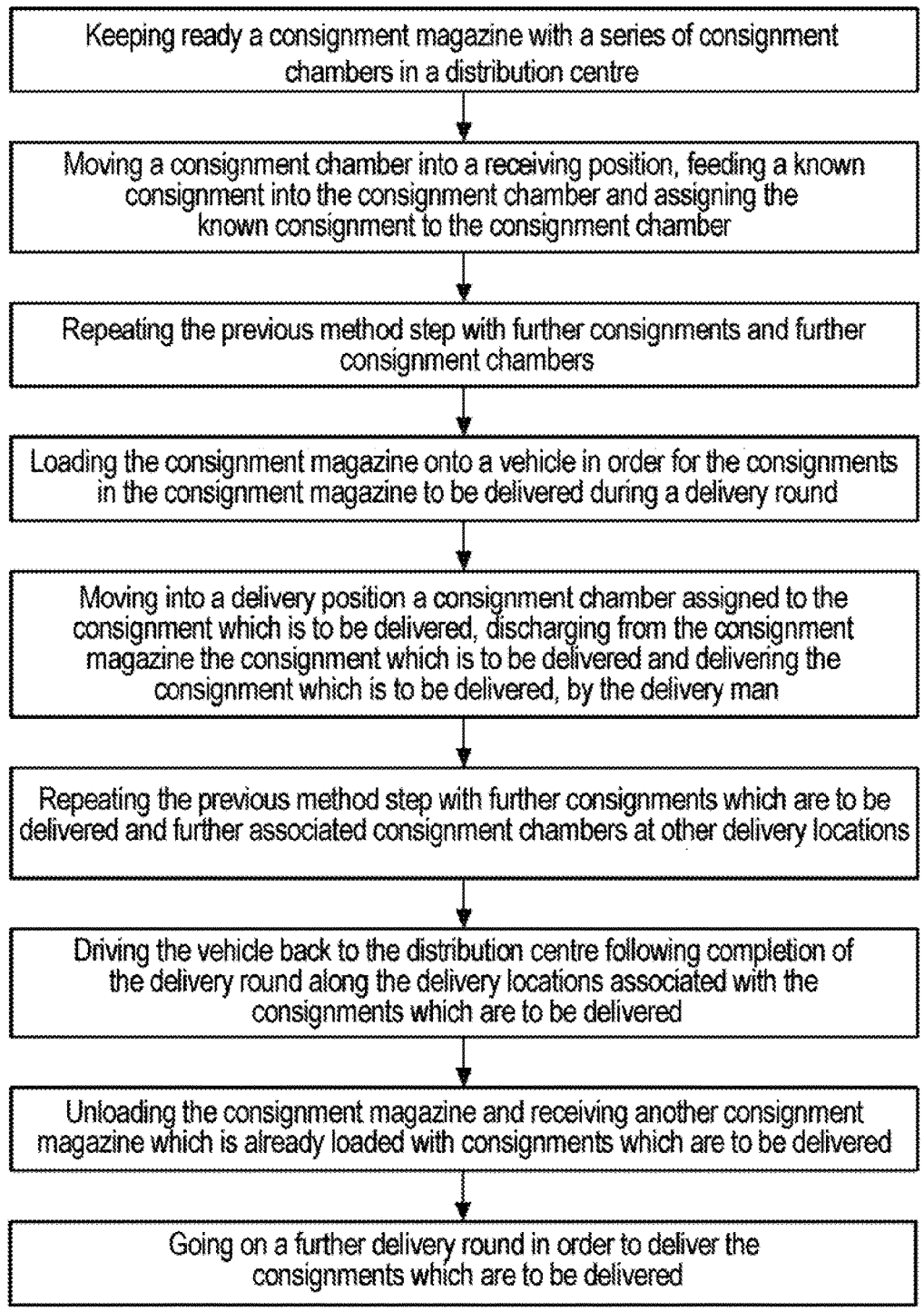
FIG. 5 shows a schematic flow-chart illustration of a method according to the invention.

FIG. 5 illustrates a flow chart of the method of delivering consignments 2. In a first step, the consignments 2 are moved, in a distribution centre 21, into a consignment magazine 1. In this case, a consignment chamber 3 is moved into a receiving position 8, 10 and a consignment 2 is introduced into the consignment chamber 3 located in the receiving position 8, 10. The consignment chamber 3 into which a consignment 2 has been introduced is established here with reference to the position of the consignment chambers 3. Moreover, a code on the consignment 2 introduced has been scanned beforehand, and it is therefore known where this consignment 2 should be delivered and in which consignment chamber 3 said consignment 2 is stored on an interim basis until it is delivered. The same is done for a series of further consignments 2 and consignment chambers 3. If all the consignments 2 for a delivery round have been received in the consignment magazine 1, the consignment magazine 1 is transferred to a vehicle 19, which delivers the consignments 2. At individual locations along the route of the vehicle 19, the latter stops and the consignment 2 which is to be delivered there is discharged from the consignment magazine 1 by the consignment chamber 3 with the appropriate consignment 2 being moved into a discharging position 8, 10. Once the consignment 2 discharged has been delivered, the vehicle 19 drives on to the next delivery location, in order for the next consignment 2 to be delivered there in the same way. Once the consignments 2 from the consignment magazine 1 have been delivered, and/or it is only not yet deliverable consignments 2 which are accommodated in the consignment magazine 1, the vehicle 19 drives back to the distribution centre 21 in order to change over the consignment magazine 1 for another consignment magazine 1, which is already loaded with consignments 2, and to travel anew a certain route for delivering the new consignments 2 and, in the process, to deliver the consignments 2 to the delivery locations envisaged therefor.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A method of delivering consignments, comprising the steps of:
    loading, in a distribution centre, different consignment chambers of a consignment magazine with different consignments,
    moving, during the operation of the consignment magazine being loaded, different consignment chambers one after the other into a receiving position for receiving at least one consignment and then into a storage position for the interim storage of the consignment received,
    documenting the assignment of the loaded consignment chambers to the consignments received in each case in the consignment chambers,
    transferring the consignment magazine loaded with consignments to a vehicle for delivering the consignments, and
    moving the consignment chambers loaded with consignments one after the other into a discharging position so that the consignment assigned to the respective consignment chamber is discharged for delivery purposes.

2. The method according to claim 1, wherein one or both of the moving steps further comprises moving the consignment chambers from the receiving position into the storage position or from the storage position into the discharging position by rotation of at least one part of the consignment magazine, in particular of at least one annular portion, which contains consignment chambers.

3. The method according to claim 1, further comprising the steps of:
    opening the at least one consignment chamber for receiving the consignment in the receiving position for discharging the consignment in the discharging position or closing the at least one consignment chamber for storing the consignment in a storage position, or
    opening at least one opening of the annular portion for receiving the consignment in the receiving position or for discharging the consignment in the discharging position or closing at least one opening of the annular portion for storing the consignment in a storage position.

4. The method according to claim 1, wherein, for the purpose of loading the consignment chambers or for the purpose of discharging the consignments from the consignment chamber of an inner annular portion, the method further comprises moving the consignments through at least one concentrically arranged outer annular portion, which preferably likewise contains a plurality of consignment chambers.

5. The method according to claim 1, further comprises loading the consignment chambers with consignments under the action of gravitational force.

6. The method according to claim 1, further comprising receiving the consignments in consignment chambers of a plurality of disc portions, which are provided preferably axially one beside the other, wherein the disc portions each have at least one annular portion, and preferably at least two concentrically arranged annular portions, containing consignment chambers.

7. The method according to claim 1, further comprising rotating at least one inner annular portion and an outer annular portion, which is arranged concentrically in relation to the inner annular portion, independently of one another about their longitudinal axis in order to receive consignments in the consignment chambers of the annular portions discharge consignments from the consignment chambers of the annular portions or both to receive consignments in or discharge consignments from the consignment chambers of the annular portions.

8. The method according to claim 1, further comprising placing at least one undeliverable consignment already discharged from the consignment magazine, in particular following an unsuccessful delivery attempt, in at least one annular portion and,
    preferably following closure of the annular portion, closure of the respective consignment chamber, or of both the annular portion and of the respective consignment chamber, rotating the annular portion so that a consignment chamber accommodating the consignment is moved into a storage position.

9. The method according to claim 1, further comprising discharging the consignments from the consignment magazine, preferably automatically, one after the other in dependence on the route covered by the vehicle.

10. A consignment magazine for receiving, storing and discharging consignments, comprising:
    at least one disc portion with an inner annular portion and an outer annular portion, which is arranged concentrically in relation to the inner annular portion,
    wherein each annular portion has a plurality of preferably circumferentially distributed consignment chambers,
    wherein the consignment chambers, the annular portions, or both the consignments chambers and the annular portions each have an outwardly oriented and closable opening.

11. A consignment magazine for receiving, storing and discharging consignments, comprising:
    at least one disc portion with an inner annular portion and an outer annular portion, which is arranged concentrically in relation to the inner annular portion,
    wherein each annular portion has a plurality of preferably circumferentially distributed consignment chambers,
    wherein the consignment magazine has at least two disc portions, which are arranged preferably axially one beside the other, or at least one operating portion, which is preferably arranged axially alongside at least one disc portion and is intended for moving at least certain consignment chambers, in particular annular portions, or for closing at least certain consignment chambers, in particular annular portions or for moving at least certain consignment chambers, in particular annular portions and for closing at least certain consignment chambers, in particular annular portions.

12. The consignment magazine according to claim 11, wherein the operating portion has at least one drive unit for moving at least certain consignment chambers, in particular annular portions, or for closing at least certain consignment chambers, in particular annular portions, or
    wherein the operating portion has a capturing unit for capturing a receiving position of at least one consignment chamber when a consignment is being received in the respective consignment chamber, or
    wherein the operating portion has at least one control unit for controlling the movement of at least one certain consignment chamber into at least one of a receiving position, a discharging position or storage position in accordance with at least partially predetermined criteria.

13. A consignment magazine for receiving, storing and discharging consignments, comprising:
    at least one disc portion with an inner annular portion and an outer annular portion, which is arranged concentrically in relation to the inner annular portion,
    wherein each annular portion has a plurality of preferably circumferentially distributed consignment chambers,
    wherein at least one annular portion, in particular all the annular portions, and/or at least one consignment chamber, in particular all the consignment chambers, have/has at least one closure device for closing an opening for receiving, discharging, or both receiving and discharging consignments.

14. A vehicle for delivering consignments, wherein at least one consignment magazine according to claim 10 is coupled in a releasable manner to the vehicle.

15. The vehicle according to claim 14, wherein the vehicle has a drive device for moving at least certain consignment chambers, in particular annular portions, for closing at least certain consignment chambers, in particular annular portions, or for moving and for closing at least certain consignment chambers, in particular annular portions.

16. The vehicle according to claim 14, wherein the vehicle has a bar portion, which engages in an axial aperture of the consignment magazine, and preferably in that the bar portion has means for driving at least one inner annular portion of the consignment magazine means for capturing the position of at least one consignment chamber of at least one inner annular portion of the consignment magazine, or both means for driving at least one inner annular portion of the consignment magazine and means for capturing the position of at least one consignment chamber of at least one inner annular portion of the consignment magazine.

17. The vehicle according to claim 14, wherein the vehicle the consignment magazine, or both the vehicle and the consignment magazine have a processor which, with reference to position-specific information, in particular GNSS (Global Navigation Satellite System) information, determines the delivery information in respect of which consignment should be the next to be delivered, and which, with reference to this delivery information, moves that consignment chamber which is assigned to the corresponding consignment into a discharging position for discharging and delivering the corresponding consignment.

18. The method according to claim 1, further comprising discharging the consignments from the consignment chambers under the action of gravitational force.

19. The method according to claim 1, further comprising loading the consignment magazine with consignments in one orientation and discharging the consignments in a different orientation of the consignment magazine, wherein preferably the one orientation is assumed in the distribution centre and the other orientation is assumed on the vehicle.

* * * * *